May 16, 1950  C. W. WARREN ET AL  2,508,051
TOLERANCE-LIMIT COMPARATOR GAUGE
Filed May 26, 1944  3 Sheets-Sheet 1
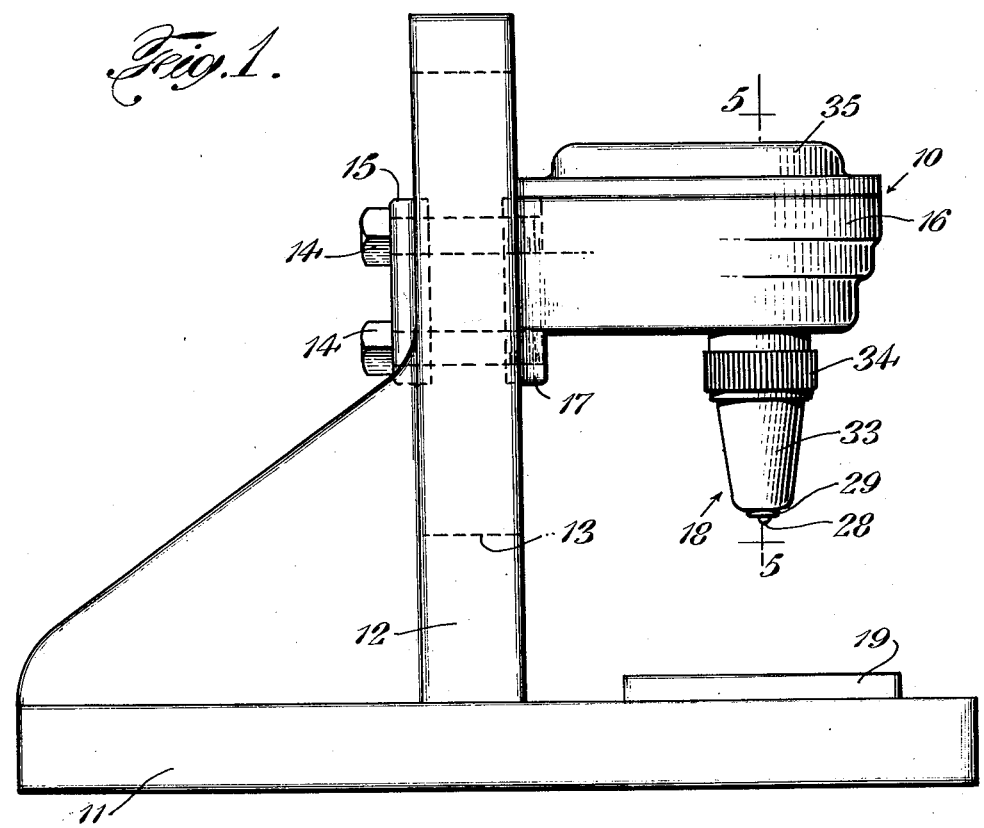
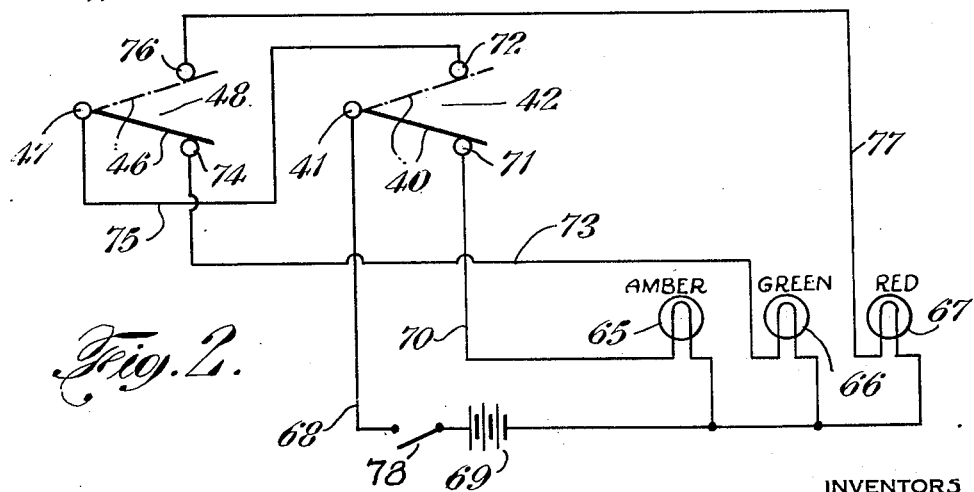
INVENTORS
Charles W. Warren
Horace J. Landay
BY
ATTORNEY

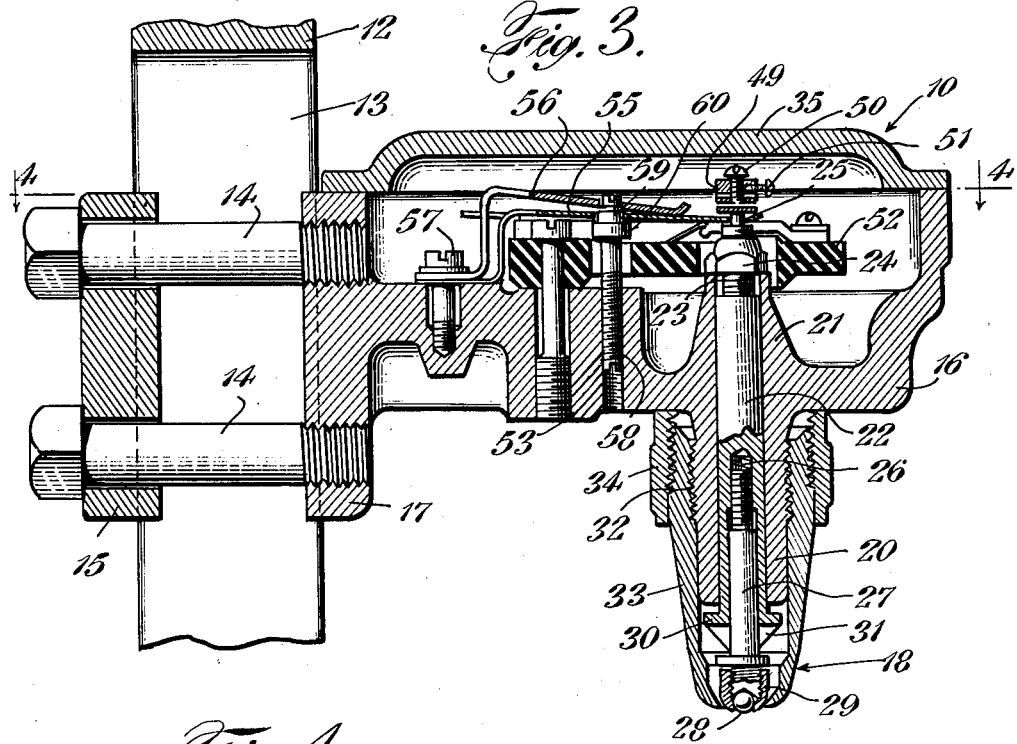

May 16, 1950  C. W. WARREN ET AL  2,508,051
TOLERANCE-LIMIT COMPARATOR GAUGE
Filed May 26, 1944  3 Sheets-Sheet 3
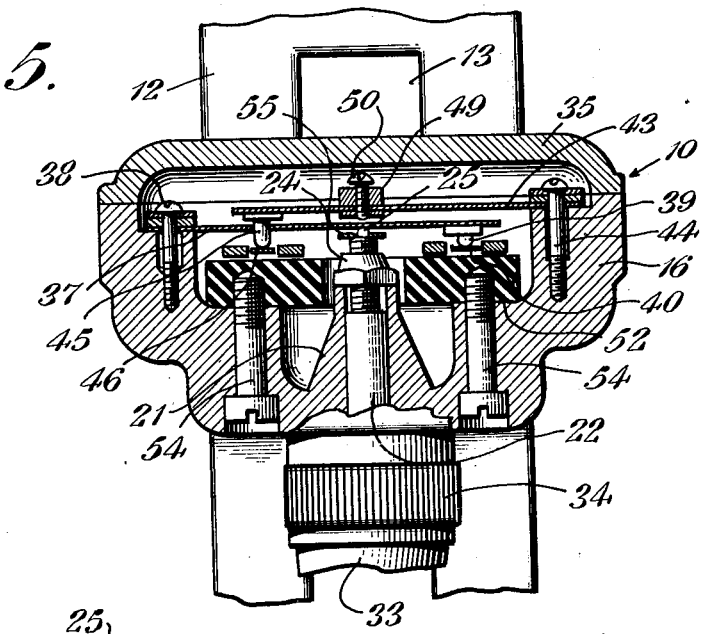
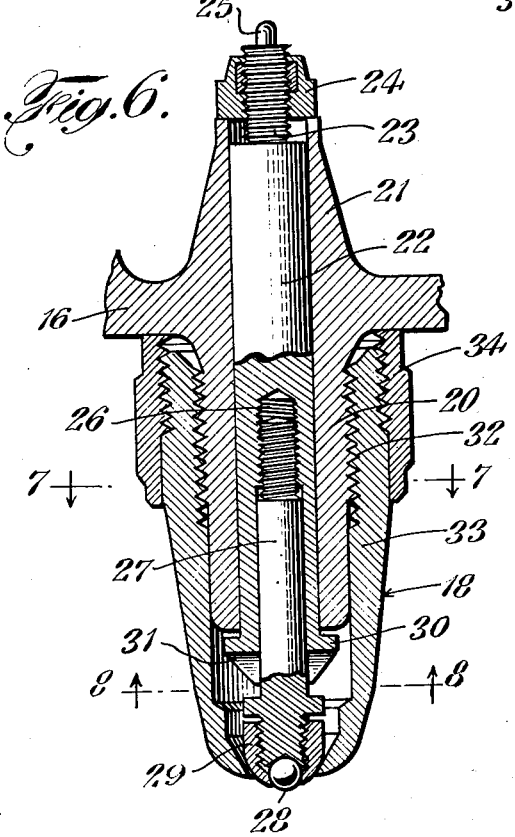
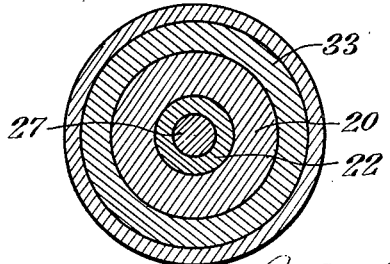
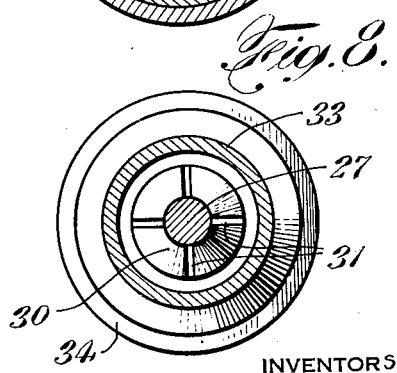
INVENTORS
Charles W. Warren
Horace J. Landay
BY
ATTORNEY Patented May 16, 1950

2,508,051

UNITED STATES PATENT OFFICE 2,508,051

TOLERANCE-LIMIT COMPARATOR GAUGE

Charles W. Warren, North Plainfield, N. J., and Horace J. Landay, Woodmere, N. Y.

Application May 26, 1944, Serial No. 537,446

12 Claims. (Cl. 33—143)

The present invention relates to apparatus for gaging articles which may be produced in large quantities with one or more dimensions lying within predetermined measurements of small permissible variation.

The principal object of the invention is to provide a gaging apparatus of extreme simplicity which is semi-automatic in operation and by virtue of which an unskilled operator may gage a piece within the finest of tolerances.

A further object of the invention is to provide a gaging device whereby an unskilled operator may instantly tell whether an article being gaged is within permissible determined limits or whether it is oversize or undersize.

A still further object is to provide a gaging device that may be readily adjusted to gage numerous different sized and different shaped objects and to provide other adjustments whereby the pressure on the gaging spindle may be varied so that either articles of a most fragile nature or those of a rugged construction may be accurately gaged.

With the foregoing objects in view and others that will later become apparent a preferred form of the invention is described in the following specification and illustrated in the drawings forming a part thereof and in which:

Fig. 1 is a side elevation of the gaging apparatus;

Fig. 2 is a wiring diagram;

Fig. 3 is a longitudinal sectional view taken on line 3—3 of Fig. 4;

Fig. 4 is a top plan view of the gaging head, the cover being removed and parts of the supporting standard being in section;

Fig. 5 is a cross sectional view taken on the line 5—5 of Figs. 1 or 4;

Fig. 6 is a longitudinal sectional view on a larger scale of the gaging spindle and its associated supporting structure; and Figs. 7 and 8 are cross sectional views taken on the lines 7—7 and 8—8 of Fig. 6.

Apparatus of the present invention may be substituted for the gaging head in the apparatus shown in our co-pending application Serial No. 484,288, filed April 23, 1943, now Patent 2,382,885, and therein employed to actuate the several electrical circuits for the purposes disclosed therein.

Referring again to the drawings, the gaging head 10 of our present application may be mounted or supported in any desired manner. As illustrated, particularly in Fig. 1, a base 11 is provided to which is secured an upright standard 12. The standard 12 has a longitudinally extending slot 13 in which the gaging head 10 is mounted for up and down movement to compensate for various heights of articles being gaged.

A pair of bolts 14 pass through the slot 13, the heads of the bolts engaging a keeper 15 on one side of the standard 12 and the opposite end of one being threaded into the body portion 16 of the gaging head and the opposite end of the other being threaded into a lug 17 depending from the body portion. The gaging head is thus firmly held in position after it has been properly set.

A gaging spindle and its supporting parts generally indicated at 18 extends downwardly from the gaging head. The article to be gaged is positioned between the operative end of the gaging spindle and an anvil 19 mounted on the base 11.

The gaging spindle and its associated parts, particularly illustrated in Figs. 3, 6, 7 and 8 will now be described. Depending from the body portion of the gaging head is a boss 20 and extending upwardly into the body portion is a boss 21. The bosses 20 and 21 are drilled to provide a bore for the axially adjustable and movable gaging spindle 22.

The upper end of the gaging spindle 22 is threaded at 23 for the reception of a lock nut 24. Beyond the lock nut the spindle is turned down to form a rounded abutment 25, the purpose of which will be hereinafter described. The lock nut 24 engages the upper end of the boss 21 and it will be apparent that by adjusting the lock nut the normal position of the gaging spindle with its rounded abutment 25 may be established.

The spindle 22 is interiorly threaded at 26 for the reception of the threaded end of a stud 27, the lower end of which extends downwardly beyond the spindle. At its extreme lower end the stud 27 is provided with a seat which accommodates a hardened steel ball 28 which is held in position by a threaded sleeve or nut 29. In the gaging operation the ball 28 contacts the article to be gaged which is resting on the anvil 19. The threaded sleeve 29 and the seat in the end of stud 27 prevent any displacement of the ball 28. The sleeve 29 may be loosened to permit the ball 28 being rotated should it be desirable to present a new engaging or contact surface to the article being gaged.

By virtue of the threaded adjustment of the stud 27 the ball 28 may be moved axially in relation to the spindle 22 and the article being gaged to permit adjustment for initial setting. The lower end of the gaging spindle 22 is enlarged as shown at 30 in Figs. 3 and 6 and this enlargement is provided with diametrical slots 31 as shown in Fig. 8, to provide in effect a plurality of fingers. These fingers are crimped inwardly prior to assembly to provide firm frictional engagement so that after the stud 27 has been properly adjusted they will grip it to maintain it in position, thus taking up any looseness in the threads 26 as well as eliminating additional threading and a lock nut.

The boss 20 is exteriorly threaded at 32 for a cover cap 33. This cap may be adjusted so that the ball 28 may protrude only the desired amount. A knurled lock nut 34 maintains the cover cap 33 in its proper position.

The body portion 16 of the gaging head provides a housing for the electrical parts and their operating mechanism which are actuated by the spindle 22. The housing 16 or body portion thereof is provided with a cover 35 secured in place by screws 36.

The rounded protuberance 25 of the gaging spindle 22 engages the under side of a lever which may advantageously take the form of a stiff spring leaf 37, secured in cantilever fashion to the housing by a screw 38. The leaf spring 37 functions as one arm of a compound lever system of the third class. A button 39, made of insulating material, is mounted on the spring leaf 37 adjacent its free end, and this button engages a spring contact carrying arm 40 supported in cantilever fashion by the screw 41 and forming part of a quick acting single pole two position switch mechanism 42 which is operated by an exceedingly slight motion of the button 39. In the position of Fig. 5 the button 39 is engaging the spring arm 40 and a circuit is completed as will be hereinafter described. A slight upward displacement of the gaging spindle, the amount depending upon its setting, will lift the lever 37 and its button 39 and break the circuit heretofore described and cause a second circuit to be completed, the purpose of which will hereinafter be described.

Another lever in the form of a stiff leaf spring 43 is positioned just above the leaf spring 37 and is secured in cantilever fashion to the housing by a screw 44. The leaf spring 43 functions as a second arm of the heretofore mentioned compound lever system. Adjacent the free end of the leaf spring 43 is mounted a button 45 of insulating material projecting through a hole in spring 37 and adapted to engage a spring contact carrying arm 46 held in position by a screw 47 forming a part of another quick acting single pole two position switch mechanism 48.

A block 49 is carried by the upper leaf spring 43 intermediate its ends and this block is threaded to receive an adjusting screw 50 in line with the gaging spindle 22. After the adjusting screw 50 has been accurately positioned it may be held there by a set screw 51. Further upward displacement of the spindle 22 will cause the lower leaf spring 37 to contact the lower end of the adjusting screw 50 which in turn will move the leaf spring or lever 43 to raise the button 45 away from the spring arm 46 to permit the second circuit to be opened and a third circuit to be closed, the purpose of which will be apparent hereinafter.

It will be noted the leaf springs or levers 37 and 43 may have weakened portions as shown in Fig. 4 adjacent the securing screws 38 and 44. The weakened portions tend to establish pivot points for the levers 37 and 43 and materially aid in causing the leaf springs or arms to function as levers and not purely as springs. It will also be noted that no pivots in the true sense of the word are employed, the arms or leaf springs 37 and 43 being constantly tensioned toward the article being gaged, or in other words being preloaded in opposition to the work. Such being the case a very slight amount of movement is all that is essential for the proper functioning of the leaf springs or levers and it naturally follows that a minimum amount of stress and strain is applied to the parts, thus greatly adding to the long life and accuracy of the gaging device.

The switches 42 and 48, as heretofore stated, are single, one-pole two position switch mechanisms operable by a very slight movement of the buttons 39 and 45, and may be as for example the mechanism shown in United States Patent No. 1,960,020, dated May 22, 1934. However, in the present invention the operating mechanisms of the switches are removed from their casings as illustrated in the patent and are mounted on a base 52 made of insulating material. This base is secured in position in the housing 16 by screws 53 and 54—54. From the foregoing and a perusal of the heretofore mentioned patent, the operation of the switches 42 and 48 will be clear without any further detailed description and illustration. Types of quick operating switch mechanisms other than that described and illustrated might be used.

Means are provided to exert variable tension on the gaging spindle 22 urging it against the article to be gaged. This means comprises a pair of springs 55 and 56 secured to the housing 16 by a screw 57. The lower spring 55 is comparatively weak and as shown in Fig. 3 its free end engages the upper end of the spindle 22 urging it downwardly. The free end of the spring 56, which is a comparatively stiff spring, engages the spring 55 at an intermediate portion thereof to provide a maximum tension as shown in Fig. 3. This tension is increased by virtue of the fact of the stiff spring 56 contacting the weak spring 55 at a point not too far remote from the upper end of the gaging spindle, so that a short arm of greater rigidity is produced between that point and the end of the weak spring in contact with the gaging spindle.

A simple tension adjusting means is provided for the springs 55 and 56. This means comprises a screw 58 having engagement with a threaded opening in the housing 16. The head of this screw passes through an aperture in the spring 56, and a shoulder 59 on the screw 58 is adapted to engage the spring 56 when the screw is moved upwardly so as to relieve the tension exerted by the spring 56 or move it entirely out of engagement with the spring 55, thus leaving only the tension of the weak spring 55 to be exerted on the gaging spindle.

A second shoulder 60 is formed on the screw 58, and a further upward displacement of the screw will relieve the tension of the weak spring 55 or move it entirely out of engagement with the upper end of the gaging spindle, leaving the gaging spindle to depend entirely upon gravity for engagement with the article being gaged. Kerfs are provided in both ends of the screw 58. The kerf in the upper end of the screw is used to make the adjustment before the cover has been secured in place. If it is desired to make an adjustment without removing the cover, the kerf in the lower end of the screw may be used.

When a strong rugged article is being gaged the maximum pressure may be applied as illustrated in Fig. 3. However, if a fragile article or a highly polished article that might be scratched is being gaged, the tension of the springs may be reduced accordingly to exert less pressure.

It will be noted the springs 55 and 56, similar to the arms or leaf springs 37 and 43, are also tensioned in a direction toward the work being operated on or gaged. The small amount of movement of the spindle during the gaging operation insures against undue strain being placed on these springs.

In assembling the gaging apparatus prior to its being set up for use, the spindle 22 is adjusted by the lock nut 24 so that its tip 25 just contacts the under side of the arm or leaf spring 37, the leaf spring at that time having its button 39 engaging the contact arm 40 of the switch mechanism 42 to depress same and cause a circuit to be completed.

After this adjustment has been made during the assembly of the gaging head and it is desired to adjust the gaging spindle to accurately gage production pieces, it is generally desirable to use two standard master pieces which correspond in dimension to the maximum and minimum acceptable dimensions. The difference in size of these pieces will therefore represent the tolerance or permissible variation allowed.

With the minimum master piece in place on the anvil 19, a rough adjustment is made by loosening the bolts 14 and permitting the gaging head 10 to be moved in its slot 13 so that the tip 28 of the spindle 22 is almost touching the master piece. The lower tip of the spindle is then adjusted by manipulating the threaded stud 27 to bring the ball into contact with the minimum standard master piece and move the tip 25 of the spindle just enough to displace the arm 37 and open the circuit normally maintained by the switch mechanism 42 as previously described. The opening of this circuit establishes a second circuit which indicates that the piece being gaged is of acceptable size within permissible tolerance.

The minimum tolerance having now been determined the minimum master piece is removed from the anvil and the standard maximum master piece is positioned thereon. The gaging spindle is thereby displaced upwardly a distance equal to the tolerance or permissible variation allowed.

The screw 50 is then adjusted so that its end just contacts the upper side of the leaf spring 37 without raising the leaf spring 43 enough to operate the switch mechanism 48. The screw 50 is then locked in position by the set screw 51. This setting may be tested by the insertion of a work piece known to be slightly oversize. If the oversize piece operates the switch 48 and the maximum work piece does not, then the setting is correct. The maximum master piece is then removed and gaging head is now set up for functioning.

In accordance with the invention visible or audible means may be provided to inform the operator when the articles being gaged are within the permissible determined limits, or that they are undersize or oversize.

Fig. 2 shows a simple wiring diagram in which amber, green and red lamps 65, 66 and 67 respectively are utilized to indicate the heretofore enumerated specifications of the articles being gaged.

When an undersized article being gaged is placed on the anvil 19, the switch 42 will not be disturbed and the first circuit heretofore described will be maintained. The spring arm 40 of the switch mechanism 42 is being depressed by the button 39 and the current flows from contact 41 through line 68, switch 78, source of power 69, amber lamp 65, line 70, contact 71, spring arm 40 and back to contact 41, thus establishing the circuit to energize the amber lamp 65 to indicate the article being gaged is undersize, after which the proper disposition of it is made.

When the article being gaged is within the permissible determined limits, the gaging spindle 22 is displaced to move the spring leaf 37 and its button 39 to permit the spring arm 40 to move upwardly away from the contact 71 and engage the contact 72 as diagrammatically indicated by broken lines in Fig. 2. In this position the above mentioned circuit illuminating amber lamp 65 is opened and the lamp extinguished and current travels from contact 41 through line 68, switch 78, source of power 69, green lamp 66, line 73 to contact 74 to switch mechanism 48, arm 46 of switch mechanism 48, contact 47, line 75, contact 72, spring arm 40 in the broken line position, and back to contact 41, thus completing the circuit to energize the green lamp 66 to indicate the article being gaged is within the permissible determined limits. This is the second circuit described in a previous part of this specification.

We will now assume the article being gaged is oversize. The oversized article on the anvil will result in an additional upward displacement of the spindle and this will cause the upper leaf spring 43 to be moved permitting the arm 46 of the switch mechanism 48 to move upwardly away from the contact 74 to engage the contact 76 as diagrammatically illustrated in Fig. 2.

Another circuit will now be established from contact 47, through line 75 to contact 72, spring arm 40, contact 41, line 68, through source of power 69, red lamp 67, line 77, contact 76, and spring arm 46, back to contact 47. The third circuit heretofore described is thus established while the previously described amber and green circuits are opened and the red lamp is energized indicating that the article being gaged is oversized.

Due to the minute amount of movement of the switches 42 and 48 in opening one circuit and closing another, their setting is quite delicate. It is desired to call attention to the fact that during all gaging operations the pressure of work gaging is in a direction away from the switches thus precluding any possibility of their delicate settings being disturbed. The maximum pressure on these switches is determined at the time of assembly by the amount of tension exerted by the leaf springs or arms 37 and 43, and under no conditions will this pressure ever be augmented. It is further to be noted that the spring leaves 37 and 43 as well as the tension springs 55 and 56 are protected from damage in case of excessive over-travel by the enlarged portion 30 of spindle 22 due to its being stopped in its upward movement by engagement with boss 20. This condition will only exist if the gage is operated with the cover cap 33 removed. When the cap is in place it will permit only a predetermined amount of over-travel movement of the spindle before the ball 28 is flush with the surface of the cap 33.

From the foregoing it is thought to be apparent that a gaging apparatus of extreme simplicity is provided in which articles of practically any shape or size may be accurately gaged for exceedingly fine tolerances. There are comparatively few moving parts in the entire apparatus and the amount of movement imparted to such parts as actually do move is so slight that it is practically impossible to strain or damage such parts.

The preferred embodiment of the invention has been described, but changes and modifications can be made, and some features can be used without others without departing from the invention as defined in the claims.

We claim:

1. A gaging apparatus comprising, in combination, a movable work contacting spindle and an anvil in line with said spindle and therewith defining a gaging position, two lever arms each mounted at one side of the axis of said spindle and extending across said axis substantially at right angles thereto and adjacent the upper end of the spindle and in directions lying in a common plane with the direction of extent of the axis of the spindle, one of said arms being in position to be operated by initial displacement of the spindle and the other of said arms being in position to be operated by further displacement of said spindle, and different means controlled by the movement of the free ends of the respective arms when the arms are displaced by said spindle to indicate whether the article being gaged is within permissible predetermined limits or whether it is undersize or oversize.

2. A gaging apparatus comprising, in combination, a movable work contacting spindle and an anvil in line with said spindle and therewith defining a gaging position, two lever arms each mounted at one side of the axis of said spindle and extending across said axis substantially at right angles thereto and adjacent the upper end of the spindle and in directions lying in a common plane with the direction of extent of the axis of the spindle, one of said arms being in position to be operated by initial displacement of the spindle and the other of said arms being in position to be operated by further displacement of said spindle, means yieldably urging said spindle and arms toward the gaging position, and different means controlled by the movement of the free ends of the respective arms when the arms are moved by said spindle to indicate whether the article being gaged is within permissible perdetermined limits or whether it is undersize or oversize.

3. A gaging apparatus comprising, in combination, a movable work contacting spindle and an anvil in line with said spindle and therewith defining a gaging position, a lever arm fulcrumed at one side of and extending across the axis of said spindle in a direction in a common plane with the axis of the spindle substantially at right angles thereto and adjacent the upper end of said spindle, a switch on the opposite side of said axis operable by the free end of said arm when the arm is actuated by initial movement of said spindle, a second lever arm also fulcrumed at one side of and extending across the axis of said spindle in a direction in a common plane with the axis of the spindle substantially at right angles thereto and above the first lever in position to be operated by continued movement of the spindle beyond said initial movement, a second switch on the opposite side of the axis of said spindle operable by the free end of said second arm when the arm is actuated by said continued movement of the spindle, and means controlled by said switches to indicate whether the article being gaged is within permissible predetermined limits or whether it is undersize or oversize.

4. A gaging apparatus comprising, in combination, a movable work contacting spindle and an anvil in line with said spindle and therewith defining a gaging position, a lever arm fulcrumed at one side of and extending across the axis of said spindle in a direction in a common plane with the axis of the spindle substantially at right angles thereto and adjacent the upper end of said spindle, said lever arm being urged toward said spindle into position to be operated by initial movement of the spindle, a quick acting switch on the opposite side of said axis and operable by the free end of said arm when the arm is actuated by the initial movement of said spindle, a second lever arm fulcrumed at the opposite side of said spindle from said first lever arm and extending across the axis of said spindle in a direction in a common plane with the axis of the spindle substantially at right angles thereto and above the first lever in position to be operated by continued movement of the spindle beyond said initial movement, said second lever arm being urged toward said spindle, a second quick acting switch operable by the free end of said second arm when the second arm is actuated by said continued movement of the spindle, and means controlled by said switches to indicate whether the article being gaged is within permissible predetermined limits or whether it is undersize or oversize.

5. A gaging apparatus comprising, in combination, a movable work contacting spindle and an anvil in line with said spindle and therewith defining a gaging position, a lever arm fulcrumed at one side of and extending across the axis of said spindle in a direction in a common plane with the axis of the spindle substantially at right angles thereto and adjacent the upper end of said spindle, said lever arm being urged toward said spindle into position to be operated by initial longitudinal displacement of the spindle, a quick acting switch on the opposite side of said axis and operable by the free end of said arm when the arm is actuated by said initial movement of said spindle, a second lever arm fulcrumed at the opposite side of said spindle from said first lever arm and extending across the axis of said spindle in a direction in a common plane with the axis of the spindle substantially at right angles thereto and above the first lever, said second lever arm being urged toward said spindle into position to be operated by continued movement of the spindle beyond said initial movement, a second quick acting switch operable by the free end of said second arm when the second arm is actuated by said continued movement of the spindle, means for exerting variable tension on said gaging spindle to urge it toward the article being gaged on said anvil, means on the upper end of said spindle for longitudinally adjusting it to bring it into proper relation with said lever arms to cause said quick acting switches to function at predetermined times, adjusting means carried by the lower end of said spindle to bring it into predetermined relation with the article being gaged, and means controlled by said switches to indicate whether the article being gaged is within permissible predetermined limits or whether it is undersize or oversize.

6. A gaging apparatus comprising, in combination, a movable work contacting spindle, a housing for said spindle, an anvil in line with said spindle and upon which the article to be gaged is adapted to rest, means for exerting variable tension on said gaging spindle to urge it toward the article being gaged, a lever arm mounted in cantilever fashion in said housing and extending across the axis of said spindle in a direction in a common plane with the axis of the spindle substantially at right angles thereto and adjacent the upper end of said spindle, said lever arm being urged toward said spindle into position to be operated by initial longitudinal displacement of the spindle, a quick acting switch operable by the free end of said arm when the arm is actuated by said initial longitudinal displacement of the spindle, a second lever arm mounted above said first arm in cantilever fashion in said housing and extending across the axis of said spindle in a direction in a common plane with the axis of the spindle substantially at right angles thereto, said second lever arm being urged toward said spindle into position to be operated by further longitudinal displacement of said spindle, a second quick acting switch operable by the free end of said second arm when the arm is actuated by said further longitudinal displacement of the spindle, and electric circuits controlled by said switch mechanisms, one of said circuits controlling indicating means to show the article being gaged is undersize, another circuit which upon the initial longitudinal displacement of the spindle controls indicating means to show the article being gaged is within permissible determined limits, and another circuit which upon further longitudinal displacement of the spindle controls indicating means to show the article being gaged is oversize.

7. A gaging apparatus comprising, in combination, a movable work contacting spindle, a housing for said spindle, an anvil in line with said spindle and upon which the article to be gaged is adapted to rest, means for exerting variable tension on said gaging spindle to urge it toward the article being gaged, a lever arm mounted in cantilever fashion in said housing and extending across the axis of said spindle substantially at right angles thereto and adjacent the upper end of said spindle, said lever arm being urged toward said spindle into position to be operated by initial longitudinal displacement of the spindle, a quick acting switch operable by the free end of said arm when the arm is actuated by said initial longitudinal displacement of the spindle, a second lever arm mounted above said first arm in cantilever fashion in said housing and extending across the axis of said spindle substantially at right angles thereto, said second lever arm being urged toward said spindle into position to be operated by further longitudinal displacement of said spindle, a second quick acting switch operable by the free end of said second arm when the second arm is actuated by said further longitudinal displacement of the spindle, means for longitudinally adjusting said spindle in relation to said housing to bring said spindle into proper relationship with said first mentioned quick acting switch to cause it to function at the proper time, adjustable means carried by said second mentioned arm for properly positioning it in relation to said second mentioned quick acting switch, and electric circuits controlled by said switch mechanisms, one of said circuits controlling indicating means to show the article being gaged is undersize, another circuit which upon the initial longitudinal displacement of the spindle controls indicating means to show the article being gaged is within permissible determined limits, and another circuit which upon further longitudinal displacement of the spindle controls indicating means to show the article being gaged is oversize.

8. A gaging apparatus comprising, in combination, a movable work contacting spindle, a housing for said spindle, an anvil in line with said spindle and upon which the article to be gaged is adapted to rest, means for exerting variable tension on said gaging spindle to urge it toward the article being gaged, a lever arm mounted in cantilever fashion in said housing and extending across the axis of said spindle substantially at right angles thereto and adjacent the upper end of said spindle, said lever arm being urged toward said spindle into position to be operated by initial longitudinal displacement of the spindle, a quick acting switch operable by the free end of said arm when the arm is actuated by said initial longitudinal displacement of the spindle, a second lever arm mounted above said first arm in cantilever fashion in said housing and extending across the axis of said spindle substantially at right angles thereto, said second lever arm being urged toward said spindle into position to be operated by further longitudinal displacement of said spindle, a second quick acting switch operable by the free end of said second arm when the second arm is actuated by said further longitudinal displacement of the spindle, a stud having screw threaded engagement with said spindle, the lower end of said stud being adapted to contact the article being gaged, frictional means on the lower end of said spindle for preventing rotational movement of said stud and taking up looseness in said threads, and electric circuits controlled by said switch mechanisms, one of said circuits controlling indicating means to show the article being gaged is undersize, another circuit which upon the initial longitudinal displacement of the spindle controls indicating means to show the article being gaged is within permissible determined limits, and another circuit which upon further longitudinal displacement of the spindle controls indicating means to show the article being gaged is oversize.

9. A gaging apparatus comprising, in combination, a movable work contacting spindle, a housing for said spindle, an anvil in line with said spindle and upon which the article to be gaged is adapted to rest, means for exerting variable tension on said gaging spindle to urge it toward the article being gaged, a lever arm mounted in cantilever fashion in said housing and extending across the axis of said spindle substantially at right angles thereto and adjacent the upper end of said spindle, said lever arm being urged toward said spindle into position to be operated by initial longitudinal displacement of the spindle, a quick acting switch operable by the free end of said arm when the arm is actuated by said initial longitudinal displacement of the spindle, a second lever arm mounted above said first arm in cantilever fashion in said housing and extending across the axis of said spindle substantially at right angles thereto, said second lever arm being urged toward said spindle into position to be operated by further longitudinal displacement of said spindle, a second quick acting switch operable by the free end of said second arm when the arm is actuated by said further longitudinal displacement of the spindle, a cover cap enclosing said spindle, the lower end of said spindle projecting through an aperture in said cover cap, means for securing said cover cap to said housing, means for adjusting and locking said cover cap in relation to said housing so that more or less of the end of said spindle may project through said aperture in said cover cap, and electric circuits controlled by said switch mechanisms, one of said circuits controlling indicating means to show the article being gaged is undersize, another circuit which upon the initial longitudinal displacement of the spindle controls indicating means to show the article being gaged is within permissible determined limits, and another circuit which upon further longitudinal displacement of the spindle controls indicating means to show the article being gaged is oversize.

10. A gaging apparatus comprising, in combination, a movable work contacting spindle, a pair of arms mounted in cantilever fashion and adapted to be moved by longitudinal displacement of the spindle, said arms extending in directions in a common plane with the axis of said spindle and adjacent the upper end of the spindle, spring means engaging the upper end of said spindle, said arms and said spring means being tensioned toward the work being gaged to effect a preloading thereof in opposition to said work, one of said arms being in position to be operated by initial displacement of the spindle and the other of said arms being in position to be operated by further displacement of said spindle, quick acting switch mechanisms operable by the free ends of said arms and three electric circuits controlled by said switch mechanisms, one circuit having indicating means to show an article being gaged is undersize, another circuit having indicating means to show the article being gaged is within permissible determined limits, and the other circuit having indicating means to show the article being gaged is oversize.

11. A gaging apparatus comprising, in combination, a movable spindle having a lower end portion for contact with an article to be gaged, a housing supporting said spindle for movement in line with an anvil upon which the article is adapted to rest, an abutment connected to the upper portion of the spindle, a pair of lever arms mounted in cantilever fashion in said housing above said abutment and in positions to be moved by the abutment when the spindle is displaced by contact with the article being gaged, a pair of quick acting switch mechanisms each of which has an operating arm in position to be actuated by the free end of one of the respective lever arms, and electric circuits controlled by said switch mechanisms, said electric circuits controlling indicating means to show whether the article being gaged is within permissible predetermined limits or whether it is undersize or oversize.

12. A gaging apparatus comprising, in combination, a movable work contacting spindle, an abutment carried by said spindle, a pair of arms mounted in cantilever fashion above said abutment and in positions to be moved by the abutment upon longitudinal displacement of the spindle, spring means contacting the upper portion of said spindle, said arms and said spring means being biased toward the work being gaged to effect a preloading of the spindle in opposition to said work, and separate indicating means controlled by the respective arms, each of said indicating means including an operating element actuated by movement of the free end of its controlling arm to indicate whether the article being gaged is within permissible predetermined limits or whether it is undersize or oversize.

CHARLES W. WARREN.
HORACE J. LANDAY.

REFERENCES CITED

The following references are of record in the file of this patent:

UNITED STATES PATENTS

| Number | Name | Date |
|---|---|---|
| 1,758,268 | Wagner | May 13, 1930 |
| 1,785,383 | Jandus et al. | Dec. 16, 1930 |
| 1,897,566 | Alden | Feb. 14, 1933 |
| 2,028,611 | Johansson | Jan. 21, 1936 |
| 2,254,313 | Poock et al. | Sept. 2, 1941 |